(12) United States Patent
Long et al.

(10) Patent No.: US 8,088,335 B2
(45) Date of Patent: Jan. 3, 2012

(54) CATALYTIC CONVERSION APPARATUS

(75) Inventors: Jun Long, Beijing (CN); Kejia Xu, Beijing (CN); Shuandi Hou, Beijing (CN); Zhijian Da, Beijing (CN); Chaogang Xie, Beijing (CN); Jiushun Zhang, Beijing (CN); Zhanzhu Zhang, Beijing (CN)

(73) Assignees: China Petroleum and Chemical Corporation, Beijing (CN); Research Institute of Petroleum Processing, Sinopec, Beijing (CN)

( * ) Notice: Subject to any disclaimer, the term of this patent is extended or adjusted under 35 U.S.C. 154(b) by 367 days.

(21) Appl. No.: 12/295,523

(22) PCT Filed: Mar. 30, 2007

(86) PCT No.: PCT/CN2007/001037
§ 371 (c)(1),
(2), (4) Date: Oct. 31, 2008

(87) PCT Pub. No.: WO2007/112680
PCT Pub. Date: Oct. 11, 2007

(65) Prior Publication Data
US 2009/0117017 A1 May 7, 2009

(30) Foreign Application Priority Data
Mar. 31, 2006 (CN) .......................... 2006 1 0066441

(51) Int. Cl.
*B01J 8/18* (2006.01)
*F27B 15/00* (2006.01)

(52) U.S. Cl. ........ 422/142; 422/144; 422/145; 422/147; 208/72; 208/113

(58) Field of Classification Search ................. 422/142, 422/144, 145, 147; 208/72, 113
See application file for complete search history.

(56) References Cited

U.S. PATENT DOCUMENTS

| 3,142,543 A * | 7/1964 | Slyngstad et al. ............ 422/144 |
| 5,290,430 A | 3/1994 | Cetinkaya |
| 2005/0029163 A1* | 2/2005 | Letzsch ........................ 208/113 |

FOREIGN PATENT DOCUMENTS

CN 1470605 A 1/2004

* cited by examiner

*Primary Examiner* — Walter Griffin
*Assistant Examiner* — Lessanework Seifu
(74) *Attorney, Agent, or Firm* — Scully, Scott, Murphy & Presser, P.C.

(57) ABSTRACT

A conversion apparatus for catalytic cracking a hydrocarbon feed to light hydrocarbon comprises at least one riser reactor, a dense bed reactor, a disengager, and a stripper. A dense bed reactor which is separated from disengage, is employed to enforce further cracking hydrocarbon to light olefins, with low methane yield. Moreover, the spent catalysts discharged from the outlet of the dense bed reactor can be introduced into the stripper via a specific catalyst transporting channel, to maintain catalyst concentration in the dense bed reactor that can be advantageous to deeper cracking of the intermediate products to produce more light olefins, particularly propylene.

23 Claims, 5 Drawing Sheets

US 8,088,335 B2

CATALYTIC CONVERSION APPARATUS

THE FIELD OF THE INVENTION

The present invention relates to a catalytic conversion apparatus, more particularly, it relates to an apparatus used for catalytically cracking feed oil in the absence of hydrogen and thereby producing light olefins (especially propylene) with a high yield.

BACKGROUND ARTS

The development in the global economy is bringing along a continuous increase in the demand for light olefins around the world. It was predicted that the total global demand for ethylene and propylene will be 140 Mt/a and 86 Mt/a, respectively by year of 2010. In China, due to the rapid increase in the national economy, the annual increase rate in the demand for light olefins is estimated to exceed the world's average level. At present, the increase rate in the demand for propylene exceeds that for ethylene. There are many processes for producing light olefins, wherein a steam-cracking technology using a light feedstock such as naphtha as the hydrocarbon oil feedstock is widely used in the world. More than 90% of the total ethylene and about 70% of the total propylene in the world are produced by the steam-cracking technology using petroleum hydrocarbons as the feedstock. However, this technology can not meet the increasing demand for light olefins. Meanwhile, crude oils become heavier and heavier around the world. The yield to produce light olefins from light hydrocarbons, such as naphtha and straight-run light diesel oil, is generally only about ⅓. Further, China suffers from insufficient supply of fuel oil and low ratio of gasoline/diesel oil output, leading to a severer shortage of light hydrocarbon feedstock. Under this circumstance, the development of a technical route for producing light olefins directly from heavy oil becomes a tendency.

U.S. Pat. No. 5,944,982 and U.S. Pat. No. 6,287,522 disclose a catalytic cracking process and a fluidized catalytic cracking apparatus using a dual riser reactor, wherein heavy feed oil is cracked in a first riser, then introduced to a product fractionating system, further, the separated gasoline or light cycle oil is then introduced to a second riser, wherein deep cracking is further carried out under a very severe condition, so as to produce more light olefins. The two risers of the apparatus share one disengager and one regenerator, while the effluents from the first riser reactor and the second riser reactor enter two fractionating towers, respectively.

CN1118539C discloses a two-stage riser catalytic cracking process, which mainly aims at series oil gas, catalyst relay, sub-section reaction, shortening reaction tilde and enhancing average performance of catalysts by using a two-stage riser reactor.

CN1526794A discloses a catalytic cracking process, which comprises: 1) catalytically cracking a feed oil for less than 1.5 s in a first riser, then introducing the effluent stream to a first fractionator; 2) catalytically cracking the resultant cycle oil from the first fractionator for less than 1.5 s, then introducing the resultant stream to the first fractionator; and 3) catalytically cracking the resultant naphtha (gasoline) and/ or optionally the resultant diesel oil from the first fractionator, wherein the reaction conditions in the first to the third risers depend on the catalyst used, which can be determined according to the desired catalytic cracking products.

However, the prior art suffers from the problem that the yield to produce light olefins from feed oil by a catalytic cracking is not so high to meet the increasing demand for light olefins in the industry. Furthermore, a great amount of less valuable dry gas is produced from the catalytic cracking of feed oil. Therefore, how to further enhance the conversion of feed oil to light olefins and simultaneously lower the yield of dry gas remains a problem to be solved in the prior art.

SUMMARY OF THE INVENTION

In order to solve the aforementioned problems in the prior art, the present inventors developed a specified catalytic conversion apparatus and thereby completed the present invention.

The present inventors have surprisingly discovered that light olefins, especially propylene, can be produced with a high yield, and the yield of dry gas can be lowered simultaneously when this catalytic conversion apparatus is used for catalytic cracking feed oils in the absence of hydrogen.

In one aspect, the present invention therefore relates to a catalytic conversion apparatus, characterized in that said apparatus comprises at least one feed oil cracking riser reactor, a dense bed reactor, a disengager, and a stripper, wherein said stripper locates below said dense bed reactor and communicates directly with the bottom of the dense bed reactor or through a fluid-communicating channel, the outlet of at least one of said riser reactor(s) communicates with the lower part of said dense bed reactor or any part of said fluid-communicating channel, the outlet of said dense bed reactor communicates with the inlet of a gas-solid separating apparatus located in said disengager through said disengager and/or through an optional transporting channel, the catalyst outlet of said disengager communicates with at least one position selected from the upper part of said stripper, any part of said fluid-communicating channel, and the lower part of said dense bed reactor, through at least one catalyst transporting channel.

The catalytic conversion apparatus according to the present invention can also comprise a catalyst regenerator for regenerating catalysts which has been subjected to a catalytic cracking, and for supplying the catalytic cracking reactor with regenerated catalysts.

With the proceeding of the cracking reaction in a riser reactor, coke begins to deposit on the catalyst, resulting in lowering of the activity of the catalyst and lowering of the catalyst concentration therein due to increasing of the gas volume. Generally, the mass concentration in the rear half section of the riser reactor is only about 30 kg/m³. Therefore, the middle fractions produced by cracking of feed oil in the riser, such as gasoline and diesel oil, and the uncracked feed oil are difficult to be further cracked into light olefins such as propylene during the rear section of the riser. For this reason, in a constitution of the present invention, the riser reactor is followed by a dense bed reactor, then the bottom of the dense bed reactor communicates with a stripper. According to this feature of the present invention, the reserves of catalysts in the dense bed reactor can be controlled by the opening of the spent catalyst flow control valve on the spent catalyst transporting conduit. The apparent gas flow rate in a riser reactor is generally at 6-30 m/s, and the apparent gas flow rate in a dense bed reactor is generally below 3 m/s. Therefore, comparing with the riser reactor, a higher catalyst concentration, generally being at 200 kg/m³ or above, in the dense bed reactor can be obtained.

According to a further constitution of the present invention, after falling onto the bottom inside the disengager by gravity settlement and recovery from the gas-solid separating apparatus, the heavily coke-deposited catalyst with an extremely low activity out from the outlet of the dense bed reactor is directed into the stripper for stripping by a separately provided catalyst transporting channel, which is separate from the oil stream in the dense bed reactor, rather than passes through the dense bed reactor directly. Therefore, the problem of lowering the average catalyst activity in the dense bed reactor associated with the intermixing of the spent catalyst with an extremely low activity with the catalyst in the dense bed reactor has been overcome.

According to this constitution of the present invention, the catalyst outlet of the disengager communicates with at least one position selected from the upper part of the stripper, any part of the fluid-communicating channel, and the lower part of the dense bed reactor through a catalyst transporting channel, rather than with other parts of the dense bed reactor. What needs to be mentioned here is that when said catalyst transporting channel communicates with the lower part of the dense bed reactor, its outlet must locate lower than the outlet of the riser reactor opening to the dense bed reactor. That is to say, the spent catalyst separated from the gas-solid separating apparatus located in the disengager is fed into the lower part of the dense bed rector below the outlet of said riser reactor, or the stripper, without passing through the upper and middle parts of the dense bed reactor. Therefore, the spent catalyst enters the stripper for stripping through a channel other than the dense bed reactor, thereby avoiding undesired excessive back mixing of the spent catalyst with the catalyst in the dense bed reactor, which is favorable for retaining a higher activity and temperature of the catalyst in the dense bed reactor. By this way, the one-pass conversion of feed oil and the utilization efficiency of the catalyst can be greatly raised, thereby rendering increase of the yield of light olefins possible.

In the present invention, said catalyst transporting channel can locate outside or inside the dense bed reactor as long as its outlet locates at the lower part of the dense bed reactor or below the dense bed reactor.

In the present invention, the outlet of said dense bed reactor communicates with the inlet of the gas-solid separating apparatus located in said disengager through said disengager and/or through an optional transporting channel. In a preferred embodiment, the outlet of said dense bed reactor communicates with said transporting channel through a reducer on the outlet thereof, while the outlet of the transporting channel communicates directly with the inlet of the gas-solid separating apparatus or opening near the inlet of the gas-solid separating apparatus. According to this feature, the effluents from the dense bed reactor can be rapidly directed into the gas-solid separating apparatus for a rapid separation of the spent catalyst from the resultant product, so as to shorten the residence time of the product in the disengager, which is favorable for inhibiting thermal cracking of oil products at high temperatures, whereby lowering the yield of dry gas.

In the present invention, the stripper locates below the dense bed reactor, and communicates with the bottom of the dense bed reactor. Thereby, the steam supplied to the stripper flows upwards and enters the dense bed reactor to serve as an injected steam for the catalytic reactions conducted therein for a second utilization, which is favorable for reducing the total energy consumption in the apparatus. Meanwhile, the total consumption of steam is lowered accordingly, and, as a whole, the load of the catalytic cracking production on the environment is thereby lowered.

Furthermore, since the stripper communicates with the dense bed reactor, the catalyst level in the dense bed reactor can be directly controlled by the flow control valve on the spent catalyst transporting conduit, and the weight hourly space velocity of the reaction in the dense bed reactor can also be controlled in this way, thereby enhancing the technological flexibility of the catalytic cracking process.

In the catalytic conversion apparatus according to the present invention, the dense bed reactor is used together with at least one riser reactor, wherein the outlet of at least one of the riser reactor(s) communicates with the lower part of the dense bed reactor or any part of said fluid-communicating channel. The feed oil is firstly subjected to a catalytic cracking reaction in the riser rector, and then the resultant intermediate products produced thereby enters the dense bed reactor for a further cracking. Therefore, the catalytic conversion apparatus according to the present invention proceeds in cracking the feed oil and the intermediate products in different reaction zones by establishing at least two separate reaction zones, thereby facilitating individual controlling and regulating of different types reaction conditions, further enhancing the technological flexibility of the catalytic cracking process. Furthermore, the conversion of feed oil to light olefins can be significantly raised by this relay catalytic cracking.

In a preferred embodiment, the catalytic conversion apparatus according to the present invention comprises two riser reactors, wherein one is a riser reactor for cracking a heavy oil, and the other is a riser reactor for cracking other feed oil other than a heavy oil (such as a light hydrocarbon). The present invention can simultaneously make use of different types of feed oils, so that the catalytic cracking process is high in the technological flexibility and wide in the applicability. Furthermore, the comprehensive conversion of feed oil to light olefins can be significantly raised.

EFFECTS OF THE INVENTION

Compared to the prior catalytic conversion apparatus, a high yield of light olefins, especially propylene can be attained with a low yield of dry gas when catalytically cracking a feed oil in the absence of hydrogen by using the catalytic conversion apparatus according to the present invention.

Meanwhile, a high technological flexibility and a high catalyst utilization efficiency are achieved according to the catalytic conversion apparatus of the present invention, further, the energy consumption and environmental load are low.

DESCRIPTION OF THE DRAWINGS

The accompanying drawing, which is included to provide a further understanding of the invention and is incorporated in and constitute a part of this specification, illustrate embodiments of the invention, and together with the description serve to explain the principles of the invention.

EXPLANATION OF THE SIGNALS

Figure 1:
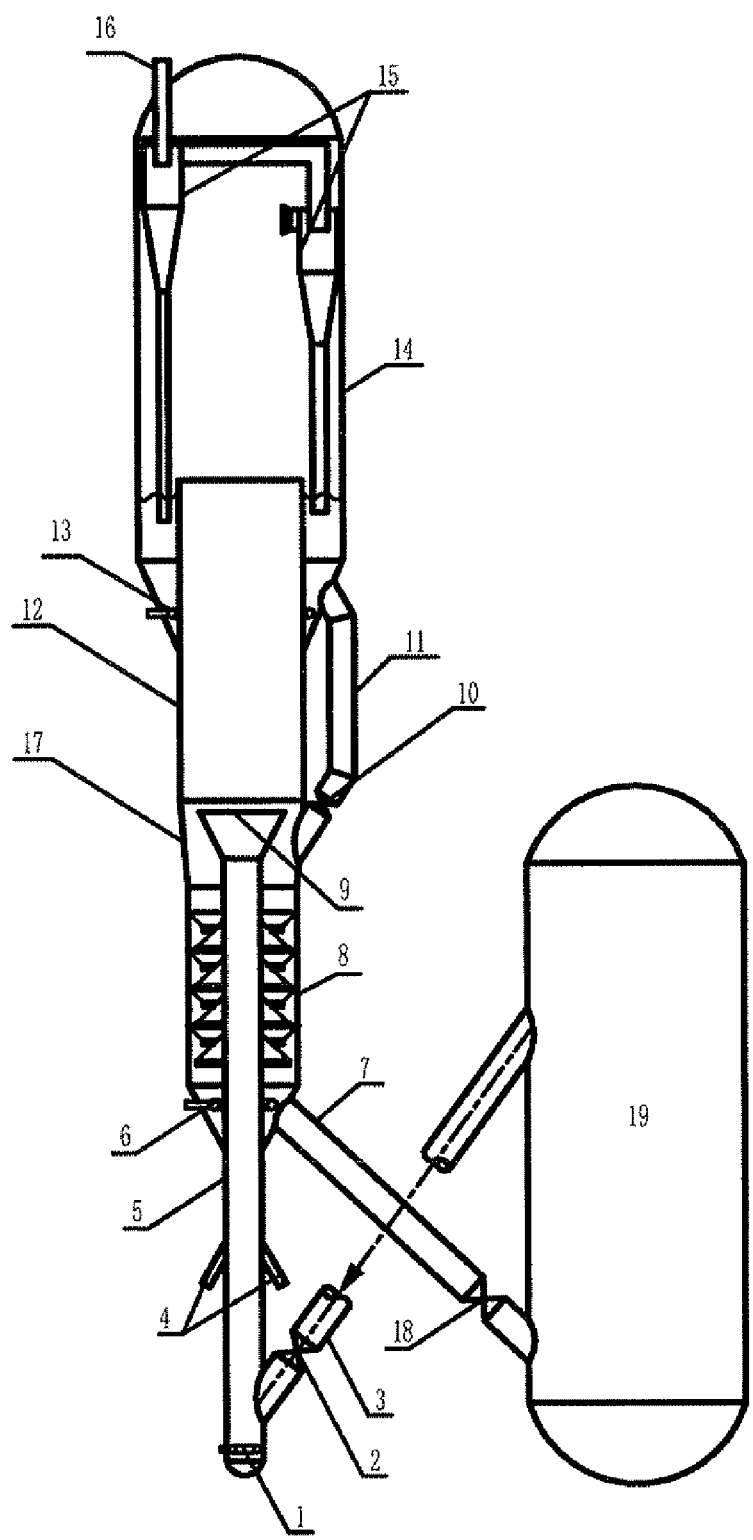
FIGS. 1 to 5 are the structural outlines schematically showing the five embodiments of the catalytic conversion apparatus according to the present invention.

5—first feed oil cracking riser reactor;
1—pre-lifting medium distributor for the first riser reactor;
3—first transporting conduit for transporting regenerated catalysts to the first riser reactor;
2—regenerated catalyst flow control valve on the first transporting conduit;
4—feed oil feeding nozzle for the first riser reactor;
9—gas-solid distributor at the outlet of the first riser reactor;
23—outlet conduit of the first riser reactor;
8—stripper;
6—stripping steam distributor inside the stripper;

7—spent catalyst transporting conduit;
18—spent catalyst flow control valve on the transporting conduit;
14—disengager;
13—fluidizing medium distributor at the lower part of the disengager;
11—catalyst transporting channel from the disengager to the stripper;
10—catalyst flow control valve on the catalyst transporting channel;
12—dense bed reactor;
21—reducer at the outlet of the dense bed reactor;
22—gas-solid distributor at the inlet of the dense bed reactor;
20—transporting conduit communicated with the outlet of the dense bed reactor;
15—gas-solid separator;
16—gas outlet of the gas-solid separator;
17—fluid-communicating channel between the stripper and the dense bed reactor;
19—regenerator;
5a—second feed oil cracking riser reactor;
1a—pre-lifting medium distributor for the second riser reactor;
3a—second transporting conduit for transporting regenerated catalysts to the second riser reactor;
2a—regenerated catalyst flow control valve on the second transporting conduit;
4a—feed oil feeding nozzle for the second riser reactor;
23a—outlet conduit of the second riser reactor;
5b—riser for transporting regenerated catalysts to the dense bed reactor;
1b—lifting medium distributor for the riser;
3b—third transporting conduit for transporting regenerated catalysts to the riser;
2b—regenerated catalyst flow control valve on the third transporting conduit; and
23b—outlet conduit of the riser.

PREFERRED EMBODIMENTS OF THE INVENTION

Additional features of the invention will be set forth in the description which follows, and in part will be apparent from the description, or may be learned by practice of the invention.

The singular forms "a", "an", and "the" include plural referents unless the context clearly dictates otherwise.

Specifically, the present invention therefore relates to a catalytic conversion apparatus, characterized in that said apparatus comprises at least one feed oil cracking riser reactor, a dense bed reactor, a disengager, and a stripper, wherein said stripper locates below said dense bed reactor and communicates with the bottom of the dense bed reactor directly or via fluid-communicating channel, the outlet of at least one of said riser reactor(s) communicates with the lower part of said dense bed reactor or any part of said fluid-communicating channel, the outlet of said dense bed reactor communicates with the inlet of a gas-solid separating apparatus located in said disengager through said disengager and/or an optional transporting channel, the catalyst outlet of said disengager communicates with at least one position selected from the upper part of said stripper, any part of said fluid-communicating channel, and the lower part of said dense bed reactor, through at least one catalyst transporting channel.

In the context of the present invention, the term "transporting channel" used herein means any channel which can transport fluid and isolate the transported fluid from the outside, including but not limited to conduits and partitions, etc. In a specific embodiment, said transporting channel is a transporting conduit.

In the context of the present invention, the term "communicate" used herein not only includes the case that the outlet/inlet of one component attaches to the wall of one or more other components, so as to connect the inner space of said component with that of said one or more other components, but also includes the case that the outlet/inlet of one component extends into the inner space of said one or more other components, so as to connect the inner space of said one component with that of said one or more other components.

In the context of the present invention, the term "fluid" used herein includes gas, liquid, and solid in a fluidized state.

In the present invention, feed oil is firstly catalytically cracked in the riser reactor. Said riser reactor may be at least any one selected from an iso-diameter tube, a tapered tube, or an assembly consisting of 1-6 straight tubes each having a different diameter connected by reducers.

Then, the effluent stream from said riser reactor (if there are multiple riser reactors, the effluent stream from at least one of the riser reactors) enters the lower part of the dense bed reactor, being further catalytically cracked when contacting the dense phase catalyst in the dense bed reactor. Said dense bed reactor may be at least any one selected from an iso-diameter tube, a tapered tube, or an assembly consisting of 1-6 straight tubes each having a different diameter connected by reducers.

In the present invention, feed oil means any hydrocarbon oil that can be used as the feedstock for the catalytic cracking. Said feed oil may be a heavy oil, which may be one or more selected from the group consisting of vacuum gas oil, coked gas oil, deasphalted oil, hydrogenated tail oil, atmospheric residual oil, vacuum residual oil, crude oil, coal liquefied oil, tar sands oil, and shale oil. Further, said feed oil may be light hydrocarbons, such as a naphtha fraction and a C4 fraction from liquefied gas, etc. In addition to this, a diesel fraction or clarified oil derived from the products from this apparatus or other apparatus may be injected into the riser reactor as a supplementary part of the feed oil. When there are more than one riser reactors in this apparatus, it is preferred to feed relatively heavy feed oil to the riser reactor which opens to the lower part the dense bed reactor.

The catalytic cracking reaction in the riser reactor and the dense bed reactor can be carried out in the conventional way under conventional conditions. There is no restriction on the catalyst to be used, which can be selected as needed from conventionally used catalysts. Preferably, said catalyst may contain 10 wt. % or more of a molecular sieve. Besides, steam for example can also be introduced into the reactor in a conventional way, as necessary.

There is no special restriction on the structure of the riser reactor, and it may be designed according to the common knowledge in the art for catalytic cracking. The diameter of the riser can be determined according to the amount of the feedstock to be processed and the apparent gas velocity as required by the processing conditions. It is desirable that the diameter of the riser is such that the average apparent gas velocity in the riser reactor is controlled in the range of 6-30 m/s. In particular, the diameter of the riser reactor can be in the range of 0.2-3 m, according to the scale of the apparatus, but is not restricted to this range.

As a rule, the diameter of the outlet section of the riser reactor is substantially equal to that of the top end of the vertical section of the riser reactor.

The structure of said dense bed reactor is designed such that the apparent gas velocity in the dense bed reactor is controlled below 3 m/s, preferably below 2.5 n/s, so that a dense phase catalyst bed can be formed in the reactor. Therefore, the ratio of the cross-sectional area of the dense bed reactor downstream the riser reactor to that of the riser rector is higher than 2:1, preferably 4-100:1.

In the context of the present invention, when a reactor or a conduit is not an iso-diameter tube, by cross-sectional area, it means the equivalent cross-sectional area of an iso-diameter tube having the same height and volume as said reactor or said conduit.

There is no special restriction on the height of the riser reactor and the dense bed reactor. As a rule, after determining the capacity of the reactor and the diameter of the reactor, the height thereof can be determined according to the reaction time as required by the processing conditions, or in case of the dense bed reactor, the height thereof can be determined according to the reaction space velocity as required by the processing conditions. For a catalytic cracking process, the reaction time in a riser reactor is generally 0.5-10 seconds, and the weight hourly space velocity in a dense bed reactor is generally 0.5-50 $h^{-1}$. Generally, the reaction time in the riser reactor should include the time of the product stream passing through the outlet section of the reactor.

As a rule, the diameter of the pre-lifting section of the riser reactor can be 0.6-1.5 times of that of the riser reactor, and the length of the pre-lifting section is generally 3-10 times of its diameter. Generally, the feed oil feeding nozzle may locate at the upper end of the pre-lifting section in case the feed oil is a heavy oil; on the other hand, the feed oil feeding nozzle may locate at any part of the pre-lifting section in case the feed oil is a light hydrocarbon.

In the riser reactor, a distributor for the pre-lifting medium can be further provided at the lower part of the pre-lifting section. When a light hydrocarbon is used as the feed oil, said distributor may be used as the feeding nozzle for the light hydrocarbon.

A multiple of groups of feed oil feeding nozzles can be provided at different positions on the riser reactor, so that lighter and heavier components in the feed oil can enter the riser reactor from said different positions respectively, thereby enhancing the applicability of the riser reactor for various feed oils.

In the present invention, said riser reactor can be one or more, and the outlet of at least one of the riser reactor(s) must communicate with the lower part of the dense bed reactor. In a preferred embodiment, there are two riser reactors, wherein one is a cracking riser reactor for heavy oil, and the other is a cracking riser reactor for feed oils other than heavy oil, such as a naphtha fraction, a diesel fraction and a residue fraction obtained by separation of propylene from liquefied gas, etc., which may come from the present apparatus or other apparatus. Under this circumstance, the outlet of the cracking riser reactor for heavy oil preferably communicates with the lower part of the dense bed reactor, while the outlet of, for example, the cracking riser reactor for light hydrocarbon can communicates with any part of the dense bed reactor.

When connecting to the dense bed reactor, the outlet conduit of the riser reactor can be horizontal, or forms a certain angle with the horizontal direction, and this angle is properly 0-45°.

In the catalytic conversion apparatus according to the present invention, the stripper can be designed according to the schemes for strippers in the prior catalytic conversion apparatus, and there is no special restriction. Generally, the circulation amount of the catalyst in the stripper can be determined according to the capacity of the apparatus and the catalyst/oil ratio required by the process, then the diameter of the stripper and that of the spent catalyst transporting conduit can be determined according to said catalyst circulation amount. The catalyst/oil ratio of a catalytic cracking reaction is generally 5-20, while the throughput of the catalyst in the stripper is generally 30-200 kg/($m^2$ s), and the throughput of the catalyst in the spent catalyst transporting conduit is generally 300-800 kg/($m^2$ s). The height of the stripper can be determined according to the stripping time of the catalyst required by the process. Generally, the stripping time of the spent catalyst in the catalytic cracking process is 30-300 s. The inner components of the stripper can also refer to the prior art stripper in a catalytic cracking apparatus. Generally, steam may be supplemented to the stripper through a steam distributor for stripping the catalyst. The apparent gas velocity in the stripper is generally 0.1-0.5 m/s.

In the present invention, the stripper is installed below the dense bed reactor, and fluid indirectly communicates with the lower part of the dense bed reactor through a fluid-communicating channel, or directly communicates therewith without the fluid-communicating channel, which can be realized in a conventional way.

In a specific embodiment of the present invention, the stripper communicates with the lower part of the dense bed reactor through a fluid-communicating channel. There is no special restriction on the diameter of the fluid-communicating channel, which is generally 0.25-1.25 times of the diameter of the dense bed reactor. There is no restriction on the length of this fluid-communicating channel either, which is generally 0.1-2.5 times of its diameter.

The fluid-communicating channel may be at least any one selected from an iso-diameter tube, a tapered tube, or an assembly consisting of 1-6 iso-diameter tubes each having a different diameter connected by reducers.

From the point of the ease for designing the catalytic cracking apparatus, when there are multiple riser reactors, it is preferred that at least one of the riser reactors locates outside the stripper. Besides, it is preferred that at most one riser reactor traverses inside the stripper and extends to the inside of the dense bed reactor, or to the inside of the fluid-communicating channel between the dense bed rector and the stripper, if any.

In a preferred embodiment, the outlet of the cracking riser reactor for heavy oil communicates with the lower part of the dense bed reactor or locates inside the fluid-communicating channel between the dense bed rector and the stripper. When the cracking riser reactor for heavy oil locates outside the stripper, it is preferred that a gas-solid distributor is provided in the lower part of the dense bed reactor but above the outlet of the cracking riser reactor for heavy oil. When the cracking riser reactor for heavy oil traverses inside the stripper and extends to the lower part of the dense bed reactor, or to the inside of the fluid-communicating channel between the dense bed rector and the stripper, it is preferred that a gas-solid distributor is provided at the outlet of the said riser reactor. There is no special restriction on the structure of the gas-solid distributor, and the design can refer to the prior art for the gas-solid distributor to be used in a catalytic cracking apparatus. For example, a punched plate type distributor may be used, wherein the punched area of said plate is such that the apparent gas velocity is at 10-40 m/s upon passage of gas through the holes thereon.

In the present invention, the outlet of at least one of the riser reactor(s) may communicate with any position on the fluid-communicating channel. Besides, at least one riser reactor can be the aforementioned cracking riser reactor for heavy oil or the cracking riser reactor for feed oil other than heavy oil (e.g., light hydrocarbon cracking riser reactor).

In the catalytic conversion apparatus according to the present invention, the disengager can be designed by referring to the prior art for a disengager, and there are no particular restriction for the dimensions of the disengager such as height, length, etc. The disengager mainly comprises a disengaging chamber, a catalyst outlet for discharging the spent catalyst out of the chamber for stripping, which spent catalyst has settled on the bottom of the disengager after a gas-solid separation, a gas outlet for discharging gas products resulted from the gas-solid separation out of the chamber, and a gas-solid separating apparatus for gas-solid separating, etc. There is no special restriction on the dimensions of these structural components, which can be designed according to the prior art.

It is preferred that a fluidizing medium distributor is provided at the bottom of the disengager for injecting a fluidizing medium to the catalyst settled on the bottom of the disengager so as to retain the catalyst in a fluidized state.

Besides, there is no special restriction on the sort of the gas-solid separating apparatus in the disengager, and said gas-solid separating apparatus can be any one or more selected form a cyclone separator, a vortex gas-solid separator, an ejection gas-solid separator, a "T" type gas-solid separator, an inverted "L" type gas-solid separator and a calotte type gas-solid separator.

In a preferred embodiment, there are at least two stage gas-solid separators in the disengager, wherein at least one stage of the gas-solid separator can separate gas from catalyst by a centrifugation mechanism.

In the present invention, the outlet of the dense bed reactor can extend to and inside the disengager, so as to communicates with the inlet of the gas-solid separating apparatus through said disengager. In a preferred embodiment, the outlet of the dense bed reactor may communicates with the inlet of a transporting channel via a reducer, then the outlet of said transporting channel may communicates with the inlet of the separating apparatus directly or via the upper space of the disengager, so as to reduce the residence time of the products from the dense bed reactor inside the disengager, whereby inhibiting thermal cracking of the products in a high temperature environment. The ratio of the cross-sectional area of said transporting channel to that of the dense bed reactor may be lower than 1:2, preferably 1:4-60. When the outlet of the transporting conduit communicates directly with the inlet of the gas-solid separating apparatus, it is preferred to provide an opening therebetween, or an opening between the outlet of a previous stage gas-solid separator and the inlet of the successive stage next to it. This can be realized by a conventional way commonly known in the art.

In a preferred embodiment, the disengager is coaxial with the dense bed reactor and locates right above the latter, while in another preferred embodiment, the stripper is coaxial with the dense bed rector and right below the latter.

In the catalytic conversion apparatus according to the present invention, the catalyst outlet of the disengager communicates with at least one position selected from the upper part of the stripper, any part of the fluid-communicating channel, and the lower part of the dense bed reactor through at least one catalyst transporting channel, and the outlet of said catalyst transporting channel is preferably lower than the outlet(s) of said riser reactor(s)

There is at least one, preferably 1-10, catalyst transporting channel(s). Besides, the catalyst transporting channel can locate outside or inside said dense bed reactor. When the catalyst transporting channel locates outside the dense bed reactor, it is preferable to provide a catalyst flow control valve on the catalyst transporting channel. When the catalyst transporting channel locates inside the dense bed reactor, it is preferable to provide a wear-resistant layer on both of the inner and outer wall of the catalyst transporting channel.

In a specific embodiment, some of the catalyst transporting channels locate outside the dense bed reactor, while others locate inside the dense bed reactor.

When there is only one catalyst transporting channel outside the dense bed reactor, the catalyst transporting channel can communicate with any one position selected from the upper part of the stripper, any part of the fluid-communicating channel, and the lower part of the dense bed reactor. When there are multiple of catalyst transporting channels outside the dense bed reactor, each of the catalyst transporting channels can communicate with at least one position selected from the upper part of the stripper, any part of the fluid-communicating channel, and the lower part of the dense bed reactor, or all the catalyst transporting channels communicate with only one of the aforesaid positions. However, there is no special restriction.

By "the catalyst transporting channel locates inside the dense bed reactor", it means that there are provided with one or more catalyst transporting conduits inside the dense bed reactor, or one or more partitions inside the dense bed reactor, specially for discharging the spent catalyst from the disengager. In this situation, the inlet of the catalyst transporting channel is just the catalyst outlet of the disengager. It is preferred that the outlet of the catalyst transporting channel is lower than the outlet of the riser reactor thereby avoiding contacting of the spent catalyst having a very low activity transporting in the catalyst transporting channel with the hydrocarbon vapor discharging from the riser reactor.

In a specific embodiment, the catalyst transporting channel locates inside the dense bed reactor and traverses inside the dense bed reactor, wherein its inlet is fixed on the reducer on the outlet of the dense bed reactor and communicates with the disengager, as the catalyst outlet of the disengager. Besides, the outlet of the catalyst transporting channel opens to a position selected from the lower part of the dense bed reactor, any part of the fluid-communicating channel, and the upper part of the stripper, thereby discharging the transported catalyst to a position below the outlet of the riser reactor which communicated with the dense bed reactor, and further directing it into the stripper by gravity.

The cross-sectional area of said catalyst transporting channel is substantially the same as that of the spent catalyst transporting conduit which transports spent catalyst from the stripper to the regenerator. When the catalyst transporting channel is a conduit, the conduit may be at least any one selected from an iso-diameter tube, a tapered tube, or an assembly consisting of 1-6 iso-diameter tubes each having a different diameter connected by reducers.

The catalytic conversion apparatus according to the present invention may also comprises a catalyst regenerator, which burns off the coke deposited on the surface or in the pores of the catalyst and restores the catalytic activity for recycle use in the catalytic conversion apparatus. There is no special restriction on the structure and dimension of the regenerator, which can be designed as needed by referring to the prior art.

The catalyst regenerator communicates with the riser reactor through at least one regenerated catalyst transporting conduit. Besides, the catalyst regenerator communicates with the stripper through at least one spent catalyst transporting conduit. In a preferred embodiment, a catalyst flow control valve is provided on the regenerated catalyst transporting conduit and the spent catalyst transporting conduit, respectively.

In a specific embodiment, the catalyst regenerator communicates with the dense bed reactor through at least one regenerated catalyst transporting channel, and a catalyst flow control valve may be provided on the transporting channel. In a particular embodiment, at least one regenerated catalyst transporting channel is a riser. The diameter of said riser can be determined according to the amount of the transported catalyst as required by the process. Herein, said riser communicates with the catalyst regenerator through a regenerated catalyst transporting conduit.

Herein, the regenerated catalyst transporting conduit, the spent catalyst transporting conduit, and the catalyst flow control valve may be designed as needed, by referring to the prior art, and there is no special restriction thereon.

In the context of the present invention, if reactors, conduits, and channel have a reducer, the cone-apex angle of said reducer can be selected in the range of 10°-150°, preferably 30°-120°.

The invention is described more fully hereinafter with reference to the accompanying drawing, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

In the drawings, the same structural component is denoted by the same reference number.

As shown by FIG. 1, in the catalytic conversion apparatus according to the present invention, the lower part of the riser reactor 5 communicates with the catalyst regenerator 19 through the regenerated catalyst transporting conduit 3, with a catalyst flow control valve 2 provided thereon. A pre-lifting medium distributor 1 is provided at the bottom of the riser reactor 5, and a feed oil feeding nozzle 4 is provided at the lower part of the riser reactor 5 but above the inlet of the regenerated catalyst. The upper part of the riser reactor 5 extends inside the stripper 8, coaxially with the stripper 8. The dense bed reactor 12 locates above the stripper 8, coaxially with the stripper. The dense bed reactor 12 communicates with the stripper 8 through the fluid-communicating channel 17. The outlet of the riser reactor 5 locates inside the fluid-communicating channel 17. The gas-solid distributor 9 is provided at the outlet of the riser reactor 5. The disengager 14 and the dense bed reactor 12 are arranged coaxially. The dense bed reactor 12 is a cylinder, the outlet of which extends inside the disengager 14. A gas-solid separating apparatus consisting of a two-stage cyclone is provided inside the disengager 14. The gas separated from the gas-solid separating apparatus is discharged out of the apparatus from the gas outlet 16 and introduced into a downstream fractionating system (not shown in the figure). A fluidizing medium distributor 13 is provided at the bottom of the disengager 14 so as to retain the catalyst therein in a fluidized state. A catalyst transporting channel 11 consisting of a conduit is provided between the disengager 14 and the fluid-communicating channel 17, with a catalyst flow control valve 10 provided thereon. The opening of the valve controls the catalyst level in the disengager. A stripping medium (steam) distributor 6 is provided at the bottom of the stripper 8. The stripper 8 communicates with the catalyst regenerator 19 through the spent catalyst transporting conduit 7, with the spent catalyst flow control valve 18 provided thereon.

Figure 2:
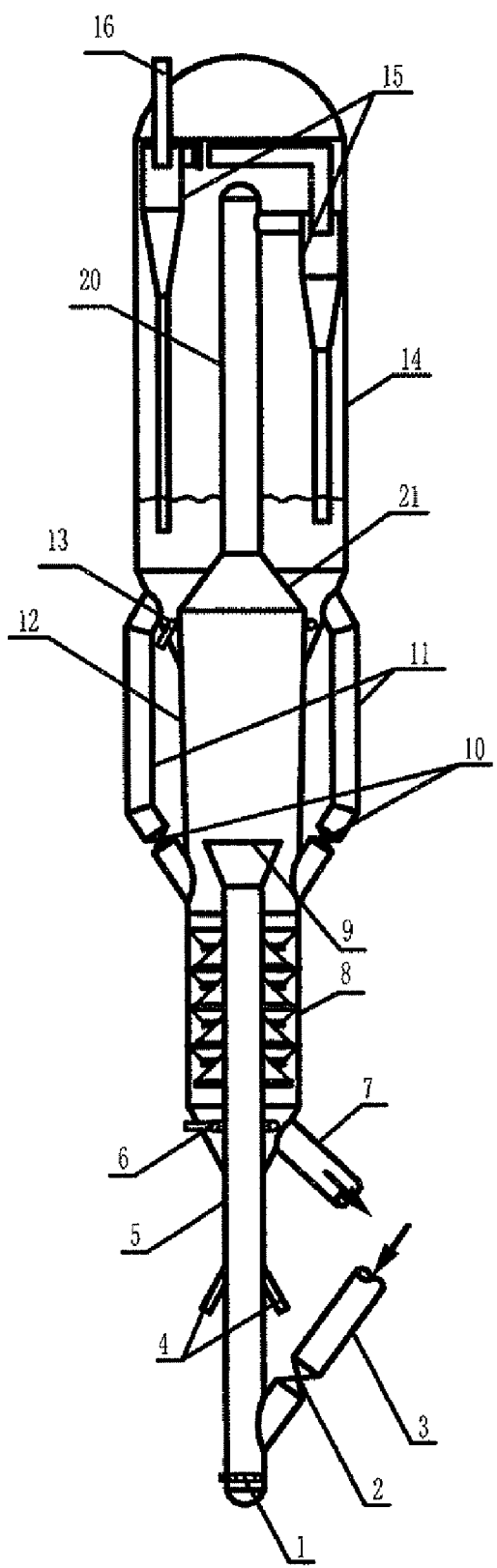

The catalytic conversion apparatus shown in FIG. 2 differs from that of FIG. 1 in that the dense bed reactor 12 consists of a tapered cylinder, the lower end of which is directly fixed with the upper end of the stripper 8, so that the dense bed reactor 12 communicates with the stripper 8. The outlet of the riser reactor 5 communicates with the lower part of the dense bed reactor 12. The outlet of the dense bed reactor 12 communicates with the transporting conduit 20 through the reducer 21. The outlet of the transporting conduit 20 communicates with the inlet of the first stage cyclone of the gas-solid separating apparatus 15. An opening is provided at where the outlet of the first stage cyclone connects the inlet of the second stage cyclone, so that the fluidizing medium (steam) injected from the fluidizing medium distributor 13 at the bottom of the disengager can enter the second stage cyclone from this opening. Besides, in this FIG. 2, the catalyst transporting channel 11 from the disengager 14 to the stripper 8 consists of two symmetrically arranged conduits, each having an outlet that communicates with the lower part of the dense bed reactor 12. Besides, as shown in FIG. 2, said outlet is generally lower than the outlet of the riser reactor 5 into the dense bed reactor 12.

Figure 3:
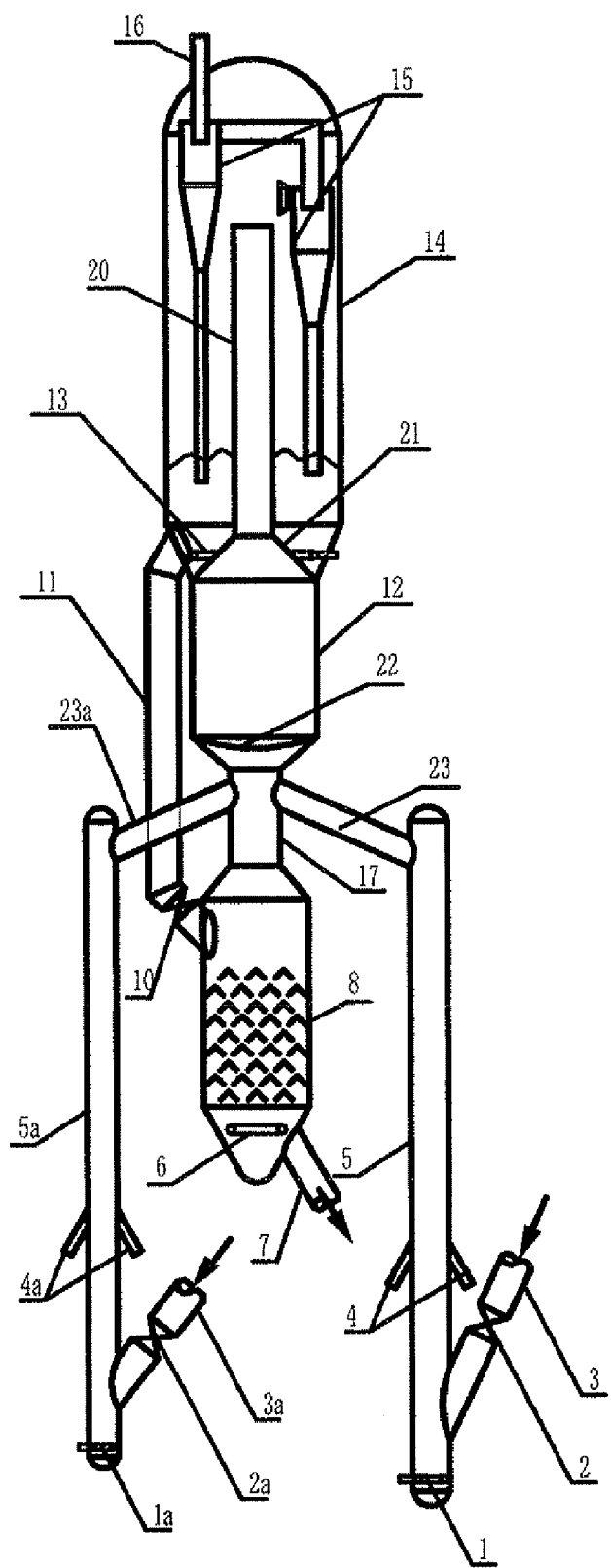

The apparatus shown in FIG. 3 comprises two riser reactors 5 and 5a, wherein the riser reactor 5 is used as a cracking riser reactor for heavy oil, while another riser reactor 5a is supplied with feed oil other than heavy oil, such as a naphtha fraction, a diesel fraction and a residue fraction obtained by separation of propylene from liquefied gas, etc., which may come from the present apparatus or other apparatus. Similar to the riser reactor 5, another riser reactor 5a communicates with a catalyst regenerator (not shown in the figure) through another regenerated catalyst transporting conduit 3a, with another regenerated catalyst flow control valve 2a provided thereon. Feed oil can be fed into the riser reactor 5a through another feed oil feeding nozzle 4a. If the boiling point of the feed oil to be feed into the riser reactor 5a is below 220° C., the feed oil can also be injected through another pre-lift medium distributor 1a at the bottom of the riser reactor 5a. Each of the outlets of the riser reactors 5 and 5a communicates with the fluid-communicating channel 17 through the outlet conduits 23 and 23a respectively, which conduit can be either horizontal or tilted (as shown in the figure). In FIG. 3, the main body of the fluid-communicating channel 17 is in a form of a iso-diameter tube, but is not restricted to this, and it may be a tapered tube, or a structure by combing a iso-diameter tube with a tapered tube. Generally, the cross-sectional area of the main body of the fluid-communicating channel 17 is not less than 0.3 time of the sum of the cross-sectional area of the riser reactors 5 and 5a. In this apparatus, the gas-solid distributor 22 is provided at the inlet of the dense bed reactor 12. In the apparatus as shown in FIG. 3, the upper end of the transporting conduit 20, which communicates the dense bed reactor 12 through the reducer 21, opens near the inlet of the first stage cyclone of the gas-solid separating apparatus 15 inside the disengager.

Figure 4:
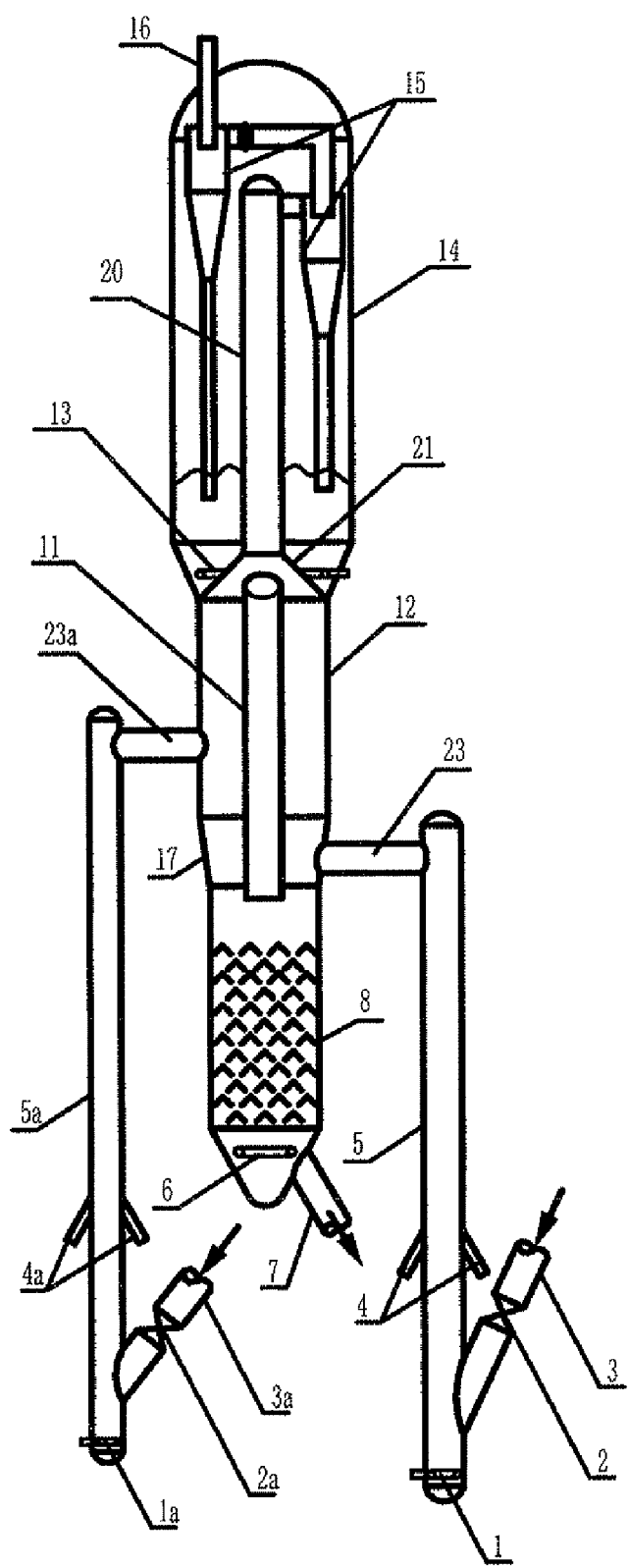

The apparatus shown in FIG. 4 differs from that shown in FIG. 3 mainly in that the outlet of another riser reactor 5a communicates with the middle part of the dense bed reactor 12 through another outlet conduit 23a, and the catalyst transporting channel 11 is a conduit traversing inside the dense bed reactor 12. The inlet of the conduit is fixed to the reducer 21 on the outlet of the dense bed reactor and communicates with the disengager 14. The conduit opens to the upper part of the stripper 8. Besides, in the apparatus shown in this figure, both of the outlet conduits 23 and 23a are horizontal, however, they may be tilted. Compared to the apparatus shown in FIG. 3, another difference of the apparatus shown in FIG. 4 lies in that the fluid-communicating channel 17 is a tapered cylinder, wherein the upper end thereof fixedly connects to and communicates with the lower end of the dense bed reactor 12, while the lower end thereof fixedly connects to and communicates with the upper end of the stripper 8. The riser reactor 5 communicates with any part of the fluid-communicating channel 17 through the horizontal outlet conduit 23.

Figure 5:
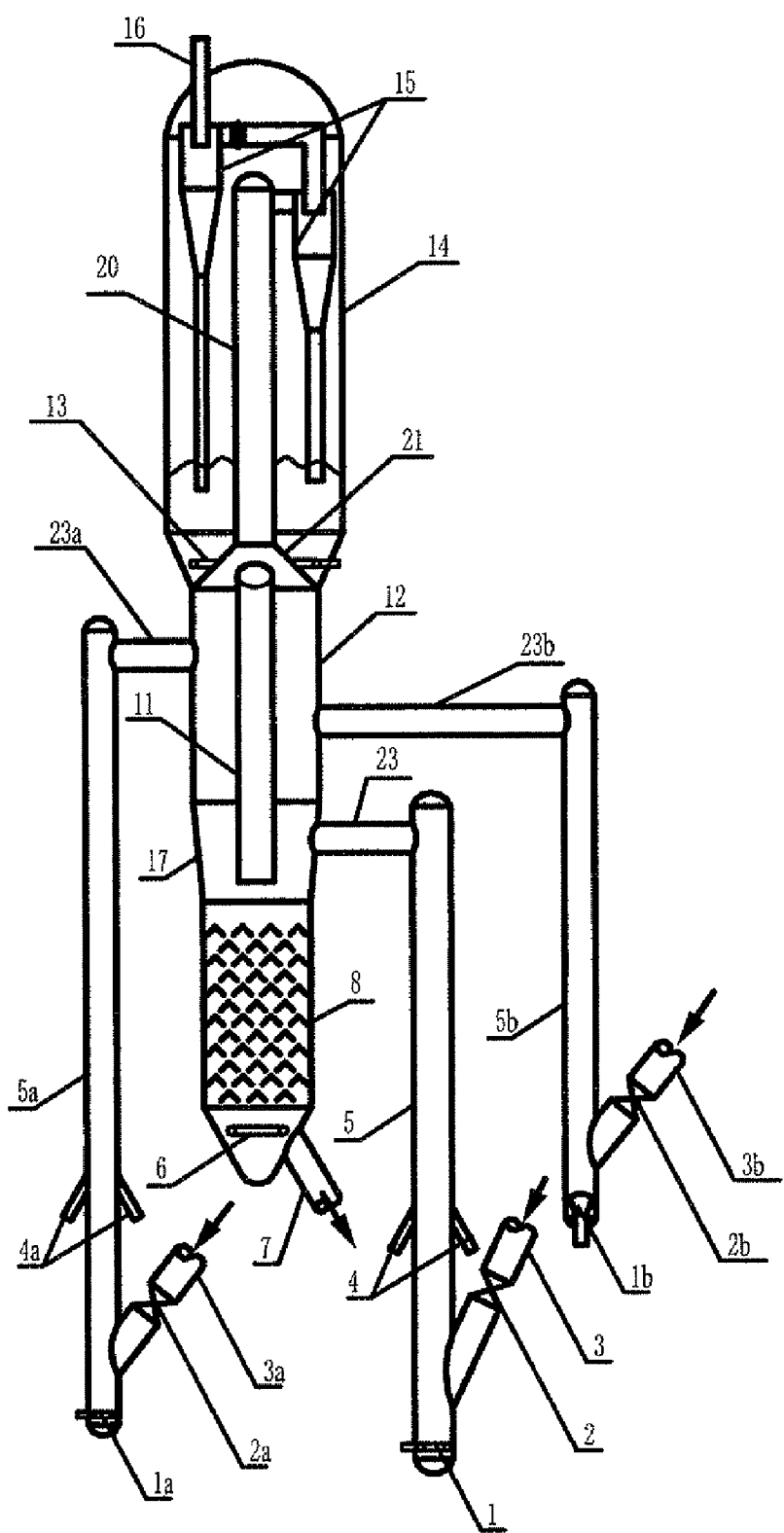

The apparatus shown in FIG. 5 differs from that shown in FIG. 4 mainly in that another riser reactor 5a communicates with the upper part of the dense bed reactor 12 through another outlet conduit 23a. The catalytic conversion apparatus also comprises the riser 5b, which transports the regenerated catalyst to the dense bed reactor 12. Said riser 5b communicates with a catalyst regenerator (not shown in the figure) through the third regenerated catalyst transporting channel 3b, whereon the third catalyst flow control valve 2b is provided. Besides, the riser 5b communicates with the dense bed reactor 12 through the horizontal (or may be tilted) third outlet conduit 23b. In the apparatus shown in FIG. 5, a stream of regenerated catalyst having a high temperature is transported to the dense bed reactor 12 through the riser 5b, which provides the catalysts in the dense bed reactor with a higher temperature and a higher activity.

EXAMPLES

The catalyst used in the examples was produced by the Qilu Catalyst Factory of Sinopec, and the active components thereof comprise a phosphorus and transition metal-modified Pentasil and a rare earth ultra-stable Y-type zeolite. The catalyst was hydrothermally aged at 800° C. for 17 hours by saturated steam before use. Its major properties are shown in Table 1.

The feed oil used in the examples and the comparative example is a vacuum gas oil, and its major properties are shown in Table 2.

Comparative Example

The comparative example was performed in a bench-scale apparatus comprising a conventional riser reactor. The throughput of the apparatus was 4 kg/hr, wherein the riser reactor had a diameter of 20 mm and a length of 6 m. In order to obtain more propylene, the catalytic cracking reaction of the feed oil was operated under severer conditions, mainly comprising a outlet temperature of 610° C., a catalyst/oil ratio of 21, a reaction pressure of 0.2 MPa and a reaction time of 1.65 s in the riser reactor. The product distribution obtained is shown in Table 3.

Example 1

Example 1 was performed in a bench-scale apparatus having a reaction-regeneration system structure as shown in FIG. 1. The heavy oil throughput of the apparatus was 4 kg/hr, wherein the riser reactor 5 in the reaction system had an inner diameter of 20 mm and a length of 6 m; the dense bed reactor 12 had an internal diameter of 78 mm and a height of 0.8 m; the stripper 8 had an internal diameter of 78 mm and a height of 2 m; the disengager 14 had an internal diameter of 205 mm and a height of 3 m; the catalyst transporting channel 11 for connecting the disengager with the stripper had an internal diameter of 30 mm and a height of 1.4 m.

In order to obtain more propylene, both the riser reactor and the dense bed reactor 12 operated under severer conditions, mainly comprising a outlet temperature of 610° C., a reaction time of 1.61 s, a catalyst/oil ratio of 21 in the riser reactor, and a reaction temperature of 580° C., a weight hourly space velocity of 2.3 $h^{-1}$ in the dense bed reactor and a reaction pressure of 0.2 MPa. The product distribution obtained is shown in Table 3.

Example 2

Example 2 was performed in a bench-scale apparatus having a structure as shown in FIG. 3. The heavy oil throughput of the apparatus was 4 kg/hr, wherein the riser reactor 5 in the reaction system had an internal diameter of 20 mm and a length of 6 m; the riser reactor 5a had an internal diameter of 12 mm and a length of 6 m; the dense bed reactor 12 had an internal diameter of 78 mm and a height of 0.4 m; the stripper 8 had an internal diameter of 78 mm and a height of 2 m; the reducer 21 communicates the dense bed reactor 12 with the transporting conduit 20 had a cone-apex angel of 60°, and the transporting conduit 20 had an internal diameter of 25 mm and a height of 2.4 m; the disengager 14 had an internal diameter of 205 mm and a height of 3 m; the fluid-communicating channel 17 between the stripper and the dense bed reactor had an internal diameter of 30 mm and a height of 0.3 m, with the upper end and the lower end thereof connecting with the dense bed reactor and the stripper through a reducer having a cone-apex angel of 90° respectively; the outlet section 8 of the riser reactor 5 had an internal diameter of 20 mm and a length of 0.5 m; the outlet section 9 of the riser reactor 5a had an internal diameter of 14 mm and a length of 0.5 m; and the catalyst transporting channel 11 for connecting the disengager with the stripper had an internal diameter of 30 mm and a height of 1.4 m.

The feed oil was injected through the feeding nozzle 4 of the riser reactor 5, and a part of the C4 and the naphtha fraction with a boiling point lower than 150° C. separated in the product fractionating system (not shown) of the apparatus were injected into the riser reactor 5a through the pre-lift medium distributor 1a and the feeding nozzle 4a, respectively. In order to obtain more propylene, the feed oil is catalytically cracked under the conditions as follows. The product distribution obtained is shown in Table 3.

The catalytic cracking conditions for the feed oil in each of the reactors comprise a outlet temperature of 590° C., a reaction time of 1.42 s, a catalyst/oil ratio of 18 in the riser reactor 5; a outlet temperature of 685° C., a reaction time of 0.86 s, a catalyst/oil ratio of 40 in the riser reactor 5a, a reaction temperature of 640° C., a weight hourly space velocity of 5.45 $h^{-1}$ in the dense bed reactor, and a reaction pressure of 0.2 MPa.

Example 3

Example 3 was performed in a bench-scale experimental apparatus having a structure as shown in FIG. 5. The heavy oil throughput of the apparatus was 4 kg/hr, wherein the riser reactor 5 in the reaction system had an internal diameter of 20 mm and a length of 6 m; the riser reactor 5a had an internal diameter of 12 mm and a length of 6 m; the riser 5b had an internal diameter of 12 mm and a length of 6 m; the dense bed reactor 12 had an internal diameter of 90 mm and a height of 0.4 m; the reducer 21 communicates the dense bed reactor with the transporting conduit 20 had a cone-apex angel of 60°, and the transporting conduit 20 had an internal diameter of 25 mm and a height of 2.4 m; the stripper 8 had an internal diameter of 78 mm and a height of 2 m; the disengager 14 had an internal diameter of 205 mm and a height of 3 m; the fluid communicating channel 17 is a tapered tube having a length of 0.35 m, with the upper end and the lower end thereof connecting with the dense bed reactor and the stripper respectively; the outlet section 8 of the riser reactor 5 had an internal diameter of 20 mm and a length of 0.5 m; the outlet section 9 of the riser reactor 5a had an internal diameter of 14 mm and a length of 0.5 m; and the catalyst transporting channel 11 for connecting the disengager with the stripper had an internal diameter of 30 mm and a height of 1.4 m.

The feed oil was injected into the riser reactor 5 through the feeding nozzle 4, and contacted with a first stream of the regenerated catalysts, and a part of the C4 and gasoline fraction with a boiling point lower than 150° C. separated in the product fractionation system (not shown) of the apparatus were injected into the riser reactor 5a through the prelift medium distributor 1a and the feeding nozzle 4a respectively, coming into contact with a second stream of the regenerated catalysts. A third stream of the regenerated catalysts was transported into the dense bed reactor 12 through the riser 5b. In order to obtain more propylene, the catalytic cracking reaction of the feed oil was operated under the following conditions. The product distribution obtained is shown in Table 3.

The reaction was operated under the conditions comprising a outlet temperature of 590° C., a reaction time of 1.47 s, a catalyst/oil ratio of 18 in the riser reactor 5; a outlet temperature of 660° C., a reaction time of 0.94 s, a catalyst/oil ratio of 28 in the riser reactor 5a; a reaction temperature of 645° C., a weight hourly space velocity of 3.15 $h^{-1}$ in the dense bed reactor and a reaction pressure of 0.2 MPa.

TABLE 1

Properties of the catalyst

| | |
|---|---|
| Specific surface area, $m^2/g$ | 155 |
| Pore volume, $cm^3/g$ | 0.176 |
| Apparent density, $g/cm^3$ | 0.91 |
| Screen composition, wt % | |
| 0-20 μm | 0.8 |
| 0-40 μm | 10.4 |
| 0-80 μm | 70.8 |
| 0-110 μm | 88.5 |
| 0-149 μm | 97.8 |
| >149 μm | 2.2 |

TABLE 2

Properties of the feed oil

| | |
|---|---|
| Density (20° C.), $g/cm^3$ | 0.8617 |
| Kinematic viscosity (80° C.), $mm^2/s$ | 7.33 |
| Freezing point, ° C. | 42 |
| Aniline point, ° C. | 105.3 |
| Molecular weight (calculated) | 391 |
| Carbon residue, wt % | 0.02 |
| H/C mole ratio | 1.895 |
| Basic nitrogen, ppm | 206 |
| Element composition | |
| C, wt % | 86.3 |
| H, wt % | 13.63 |
| N, ppm | 560 |
| S, ppm | 810 |
| SARA composition, wt % | |
| Saturates | 85.0 |
| Aromatics | 12.0 |
| Resins | 3.0 |
| Asphaltenes | <0.1 |
| Metal content, ppm | |
| Cu | <0.1 |
| Fe | 2 |
| Na | 1.8 |
| Ni | <0.1 |
| V | <0.1 |
| Boiling range, ° C. | |
| Initial boiling point | 286 |
| 5% | 343 |
| 10% | 368 |
| 30% | 410 |
| 50% | 437 |
| 70% | 465 |
| 90% | 498 |
| 95% | 512 |

TABLE 3

Product distribution

| Item | Comparative Example | Example 1 | Example 2 | Example 3 |
|---|---|---|---|---|
| Product distribution, wt % | | | | |
| Dry gas | 18.32 | 17.58 | 16.12 | 15.78 |
| LPG | 32.55 | 39.23 | 43.53 | 47.12 |
| $C_5^+$ gasoline | 29.23 | 26.70 | 23.70 | 22.67 |
| LCO | 10.25 | 8.12 | 8.97 | 8.23 |
| HCO | 4.12 | 2.95 | 2.64 | 2.55 |
| Coke | 5.53 | 5.42 | 5.04 | 5.65 |
| Total | 100 | 100.00 | 100.00 | 100.00 |
| Propylene yield | 17.26 | 23.52 | 30.86 | 32.43 |

In can be seen from comparison of the comparative example with the examples that by using the catalytic conversion apparatus according to the present invention to produce propylene from heavy oil as a feedstock, high propylene yield can be obtained, and the yield of dry gas is obviously lowered simultaneously.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

The invention claimed is:

1. A catalytic conversion apparatus, characterized in that said apparatus comprises at least one feed oil cracking riser reactor, a dense bed reactor, a disengager having a gas-solid separating apparatus therein, and a stripper, wherein
said stripper is located below said dense bed reactor and communicates with the bottom of the dense bed reactor through a fluid-communicating channel or directly communicates therewith out the fluid-communicating channel,
the outlet of at least one of said riser reactor(s) communicates with the lower part of said dense bed reactor or any part of said fluid-communicating channel,
the outlet of said dense bed reactor communicates with the inlet of a gas-solid separating apparatus located in said disengager through said disengager and/or through an optional transporting channel,
the catalyst outlet of said disengager communicates with at least one position selected from the upper part of said stripper, any part of said fluid-communicating channel, and the lower part of said dense bed reactor, through at least one catalyst transporting channel,
wherein the catalytic conversion apparatus is constructed so that the spent catalyst separated from the gas-solid separating apparatus located in the disengage is directed to the lower part of the dense bed reactor below the outlet of said riser reactor, or the stripper, without passing through the upper and middle parts of the dense bed reactor.

2. The catalytic conversion apparatus according claim 1, characterized in that the ratio of the cross-sectional area of said dense bed reactor to that of said riser reactor is higher than 2:1.

3. The catalytic conversion apparatus according claim 1, characterized in that the ratio of the cross-sectional area of said dense bed reactor to that of said riser reactor is 4-100:1.

4. The catalytic conversion apparatus according claim 1, characterized in that there is a reducer on the outlet of the reactor, and said dense bed reactor communicates with said transporting channel through the reducer.

5. The catalytic conversion apparatus according claim 4, characterized in that the ratio of the cross-sectional area of said dense bed reactor to that of said transporting channel is higher than 2:1.

6. The catalytic conversion apparatus according claim 4, characterized in that the ratio of the cross-sectional area of said dense bed reactor to that of said transporting channel is 4-60:1.

7. The catalytic conversion apparatus according claim 1, characterized in that it also comprises a catalyst regenerator.

8. The catalytic conversion apparatus according claim 1, characterized in that it comprises two riser reactors, wherein one is a cracking riser reactor of heavy oil, and another is a cracking riser reactor of other feed oils except heavy oil.

9. The catalytic conversion apparatus according claim 1, characterized in that said disengager is coaxial with said dense bed reactor and locates right above the latter.

10. The catalytic conversion apparatus according claim 1, characterized in that said stripper is coaxial with said dense bed reactor and locates right below the latter.

11. The catalytic conversion apparatus according claim 1, characterized in that said riser reactor is at least any one selected from iso-diameter tube, tapered tube, or assembly of 1-6 iso-diameter tubes having different diameters connected by reducers.

12. The catalytic conversion apparatus according claim 1, characterized in that said dense bed reactor is at least any one selected from iso-diameter tube, tapered tube, or assembly of 1-6 iso-diameter tubes having different diameters connected by reducers.

13. The catalytic conversion apparatus according claim 1, characterized in that at least one said catalyst transporting channel locates outside said dense bed reactor and the number of the channel is 1-10.

14. The catalytic conversion apparatus according claim 1, characterized in that at least one said catalyst transporting channel locates inside said dense bed reactor and the number is 1-10.

15. The catalytic conversion apparatus according claim 1, characterized in that at least one said riser reactor locates outside said stripper.

16. The catalytic conversion apparatus according claim 1, characterized in that at most one said riser reactor traverses the inside of said stripper and extends to the inside of said stripper or the inside of said fluid-communicating channel.

17. The catalytic conversion apparatus according claim 7, characterized in that said catalyst regenerator communicates with said riser reactor through at least one regenerated catalyst transporting conduit respectively, and said catalyst regenerator communicates with said stripper through at least one spent catalyst transporting conduit.

18. The catalytic conversion apparatus according claim 7, characterized in that said catalyst regenerator communicates with said dense bed reactor through at least one regenerated catalyst transporting channel.

19. The catalytic conversion apparatus according claim 18, characterized in that at least one said regenerated catalyst transporting channel is the riser.

20. The catalytic conversion apparatus according claim 17 or 18, characterized in that a catalyst flow control valve is provided on at least one said transporting conduit.

21. The catalytic conversion apparatus according claim 13, characterized in that a catalyst flow control valve is provided on at least one catalyst transporting channel.

22. The catalytic conversion apparatus according claim 1, characterized in that said fluid-communicating channel is at least any one selected from iso-diameter tube, tapered tube, or assembly of 1-6 iso-diameter tubes having different diameters connected by reducers.

23. The catalytic conversion apparatus according claim 8, characterized in that the outlet of said cracking riser reactor of other feed oils except heavy oil communicate with said dense bed reactor or any position of said fluid-communicating channel.

* * * * *